United States Patent [19]

Below et al.

[11] Patent Number: 4,712,234

[45] Date of Patent: Dec. 8, 1987

[54] MULTI-PURPOSE MODULAR JACK CONNECTING BLOCK

[75] Inventors: Randy Below, Woodbury, Conn.; Howard Burke, Stone Mountain, Ga.; Stephen M. Thomas, Torrington, Conn.

[73] Assignee: The Siemon Company, Watertown, Conn.

[21] Appl. No.: 706,971

[22] Filed: Mar. 1, 1985

[51] Int. Cl.⁴ .................. H04M 9/00; H01R 13/502; H01R 13/66; H01R 13/73

[52] U.S. Cl. ...................................... 379/399; 379/27; 379/419; 379/438; 439/344; 439/562; 439/676

[58] Field of Search ................... 179/146 R, 178, 179, 179/91 A; 339/125 R, 126 R, 154 A, 176 M; 379/27, 399, 412, 419, 437, 438

[56] References Cited

U.S. PATENT DOCUMENTS

| | | | |
|---|---|---|---|
| 3,376,542 | 4/1968 | Vlaminck | 339/125 |
| 4,146,292 | 3/1979 | Garrett | 339/176 M |
| 4,411,485 | 10/1983 | Wiseheart et al. | 179/178 |
| 4,488,008 | 12/1984 | Dellinger et al. | 179/179 |
| 4,560,839 | 12/1985 | Dillard | 179/179 |

OTHER PUBLICATIONS

Dix, W. A., "Surface Mounted Connecting Block", *Western Electric Technical Digest*, No. 63, Jul. 1981, p. 15.

*Primary Examiner*—Gene Z. Rubinson
*Assistant Examiner*—Danita R. Byrd
*Attorney, Agent, or Firm*—Fishman & Dionne

[57] ABSTRACT

A substantially rectangular modular jack connecting block suitable for use in the connection or mounting of terminal equipment using modular plugs, i.e., wall phones and the like, and including separable interior portions and add-on portions which transform the modular jack connecting block to other types of connecting devices suitable for a variety of other connecting applications is presented.

42 Claims, 25 Drawing Figures

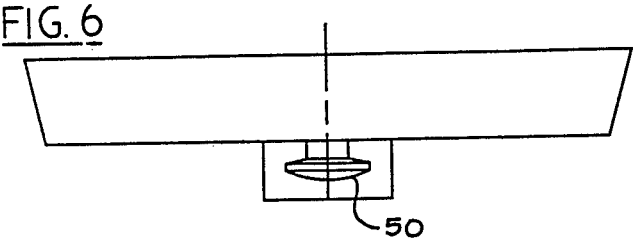
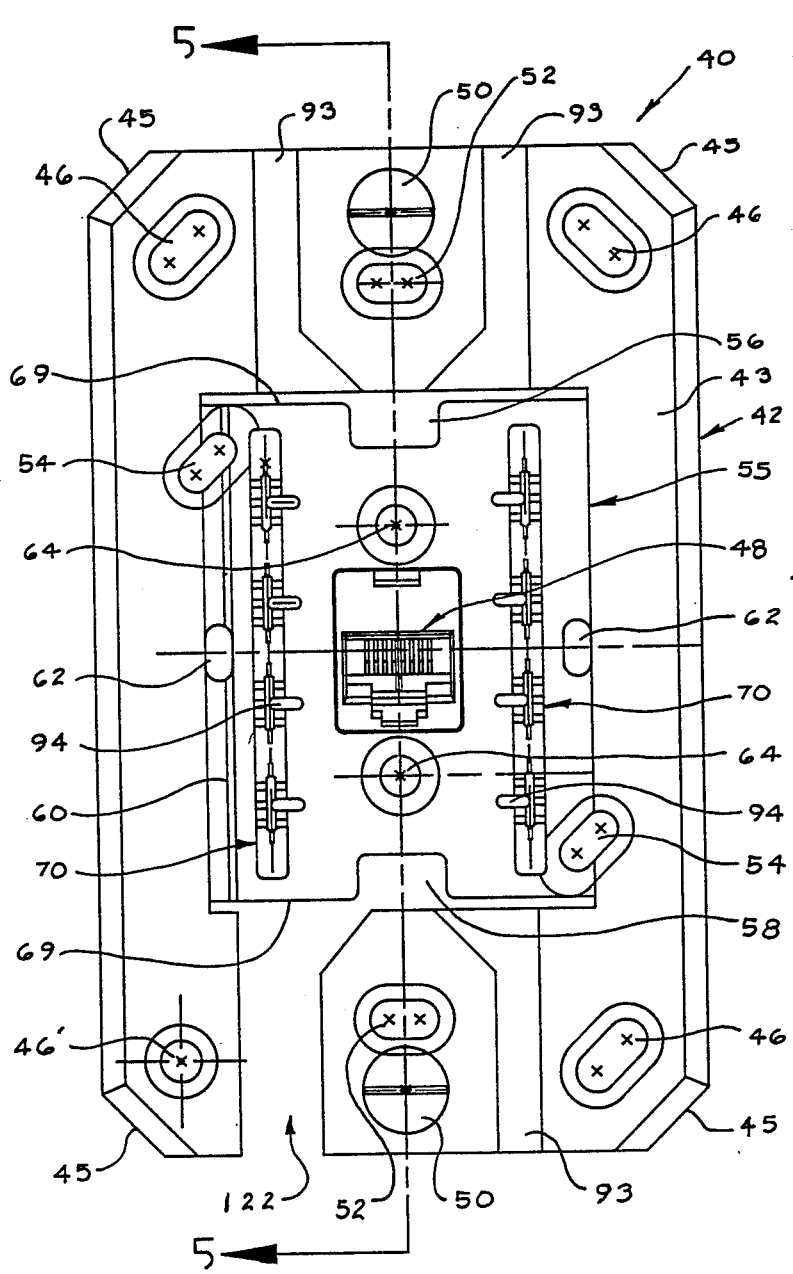
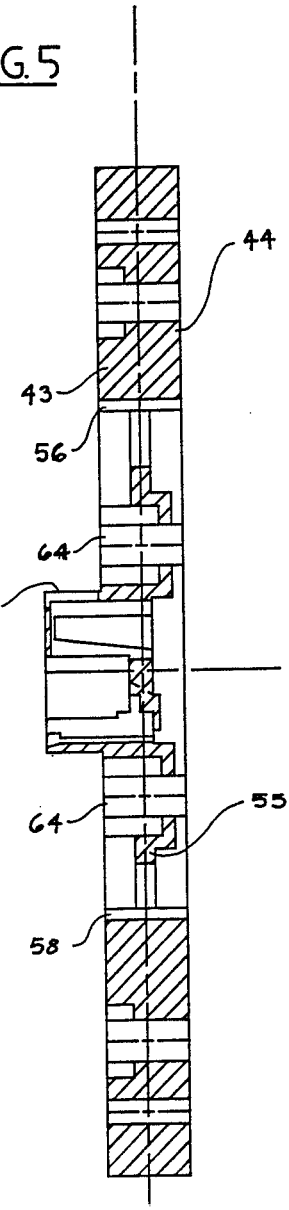

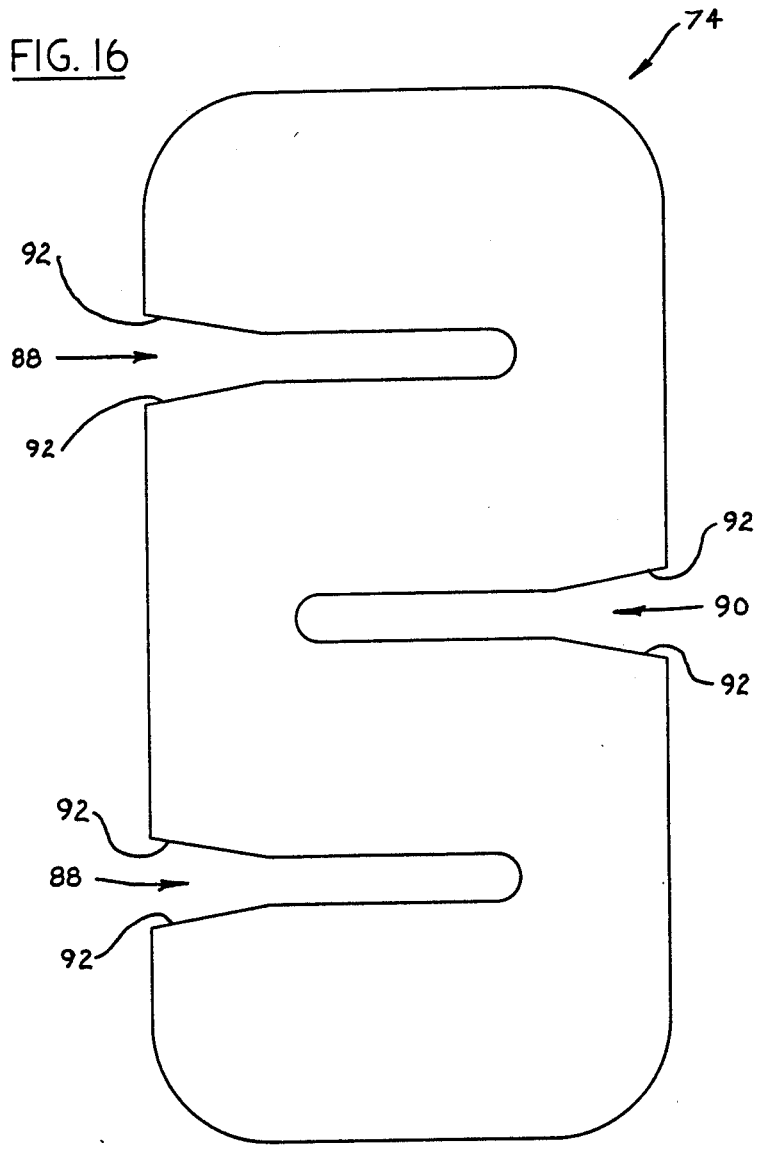

MULTI-PURPOSE MODULAR JACK CONNECTING BLOCK

BACKGROUND OF THE INVENTION

This invention relates to a modular jack connecting block or plate. More particularly, this invention relates to a new and improved multi-purpose modular jack connecting block which may be used for many applications in the telephonic art which have heretofore necessitated multiple types of connecting blocks.

Modular jacks (and modular plugs) are currently used throughout the telephonic and related industries. Modular connectors, i.e., jacks and plugs, provide many features and advantages over prior art connectors including ease of connection and disconnection, as well as being a universal standard thereby alleviating purchasing, repair and inventory costs. As a result of the prevalent use of modular jacks and plugs, associated equipment and various devices such as housings, blocks and plates have been developed to form a complete "modular" system of telephonic accessory equipment. In particular, there are presently at least three general types of modular jack connecting blocks or plates which are now extensively used for three separate applications. These three blocks are commonly referred to as flush and non-flush (surface mounted) blocks.

One such well known flush mounted modular jack connecting device is used as a connecting block in attaching wall-mounted telephones to walls, boxes, etc. This connecting plate is shown in FIG. 1 and is comprised of an essentially rectangular, electrically non-conductive plate having means thereon for effecting attachment to a wall box or other housing. This plate also includes a modular jack along with means for attaching a telephone thereon.

A second general type of flush mounted modular jack connecting plate or block is shown in FIG. 2 and is typically used in a box on a wall or floor to provide access between, for example, extension type telephones and the telephone wiring system. Such well-known modular jack connecting blocks usually consist of a substantially octagonal face plate having at least one modular jack in the center thereof surrounded by a circular area.

A third general type of non-flush modular jack connecting block is comprised of a square, round or rectangular box having modular jack means on the front or side faces thereof for accepting a modular plug (see FIG. 3). This third type of connecting block is frequently found mounted on walls, baseboards, desks (i.e., office furniture), etc.

The above-discussed general types of modular jack connecting devices are well known to those skilled in the art. It follows that the use of three structurally distinct modular jack connecting blocks suffers from certain economic drawbacks as far as increased (and possibly duplicative) purchasing, manufacturing and inventory costs are concerned. Moreover, the use of three separate connecting plates may be cumbersome to the installer and repairperson in the field in that all three types of plates must accompany the worker at all times. Furthermore, it is also well known that each type of block described above utilizes either a 2, 4, 6 or 8 wire modular jack depending upon the modular plug which is used in conjunction therewith. Accordingly, the three distinct types of blocks; flush and non-flush applications; and presence of 2, 4, 6 or 8 wire modular jacks presently necessitates the manufacture and inventory of at least ten (10) different varieties of modular jack connecting blocks.

SUMMARY OF THE INVENTION

The above-discussed and other problems of the prior art are overcome or alleviated by the modular jack connecting block of the present invention. In accordance with the present invention, a novel modular jack connecting block is provided which uniquely combines the functions of the three heretofore discussed existing connecting blocks for both flush and non-flush applications.

The present invention is essentially comprised of a substantially rectangular modular jack connecting block suitable for use in mounting terminal equipment using modular plugs, i.e., wall phones and the like, and includes both a separable, internal cut-out portion and separate add-on or cover plate portions which transforms the modular jack connecting block into other types of connecting blocks suitable for connecting a variety of telephonic equipment in flush and non-flush applications. Additionally, a novel modified modular jack which is capable of accepting 2, 4, 6 or 8 wire modular plugs is incorporated into the present invention. Thus, the novel structure of the present invention provides a modular jack connecting block which may be used interchangeably in at least ten separate applications. The resulting benefits and advantages of the present invention include less inventory and less numbers of parts and consequently great economic savings. Also, a single modular jack connecting block which accomplishes the functions which previously necessitated at least ten connecting plates greatly reduces the workload on the installer or repair person out in the field.

The above-discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several Figures:

FIG. 4 is a front elevation view of a modular jack connecting block in accordance with the present invention;

FIG. 5 is a cross-sectional elevation view along the line 5B—5B of FIG. 4;

FIG. 6 is an end view of the modular jack connecting block of FIG. 5;

FIG. 16 is an enlarged elevation view of a connector blade used in conjunction with the insulation displacement connector assemblies of FIGS. 10-15;

DESCRIPTION OF THE PREFERRED EMBODIMENT

Figure 1:
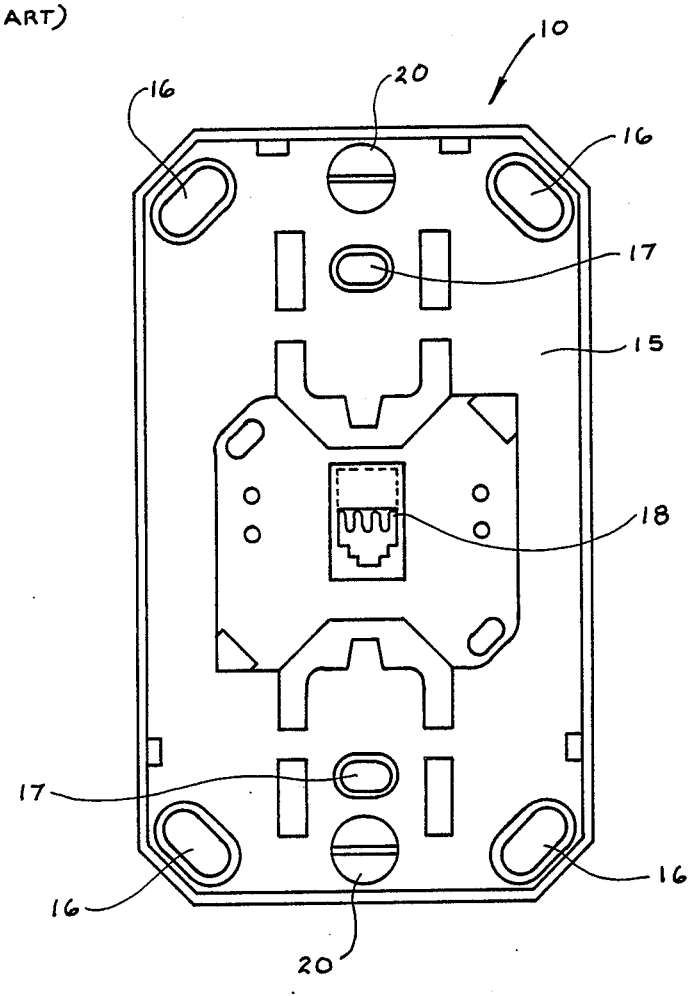
FIG. 1 is a front elevation view of a first type of modular jack connecting plate in accordance with the prior art.
Figure 2:
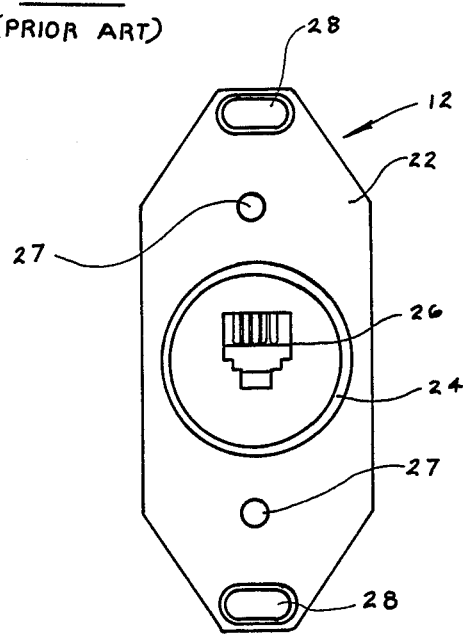
FIG. 2 is a front elevation view of a second type of modular jack connecting plate in accordance with the prior art.

Referring first to FIGS. 1-3, three general types of modular jack connecting devices in accordance with the prior art are respectively shown at 10, 12 and 14. More particularly, in FIG. 1, a well known flush mounted modular jack connecting plate 10 is shown which is generally well suited for the attachment of wall phones and the like to boxes, walls, etc. Connecting plate 10 consists of a substantially rectangular nonconductive (i.e., plastic) plate 15 having openings 16 at the four corners thereof for connection to a wall or suitable box (not shown). Plate 10 also includes further mounting holes 17. Standard connecting plate 10 includes a modular jack 18 at about the center thereof which typically is a four or six position (i.e., four or six wire) modular jack. Modular jack connecting plate 10 also includes protrusions 20 or similar means for mounting a wall telephone on the front face thereof. In mounting such a telephone (not shown), a modular plug (not shown) protruding from the telephone is inserted into modular jack 18 to make electrical contact therewith while mounting means 20 effects mechanical attachment therebetween.

Turning now to FIG. 2, a second general type of flush mounted modular jack connecting device 12 typically used in conjunction with, for example, telephone mounting cords and phones is shown. Connecting device 12 consists of a substantially octagonal face plate 22 with a circular (with single jack) or oval (with double jack) area 24 outlined in the center thereof. This circular or oval area 24 contains a modular jack 26. It will be appreciated that a decorative outer plate (not shown) can be affixed via screw holes 27 thereby exposing only that portion of plate 22 with includes the circular or oval area 24 and modular jack 26. Octagonal connecting device 12 is also provided with a pair of mounting holes 28. Connecting device 12 is usually mounted in a wall box or floor box.

Figure 3A:
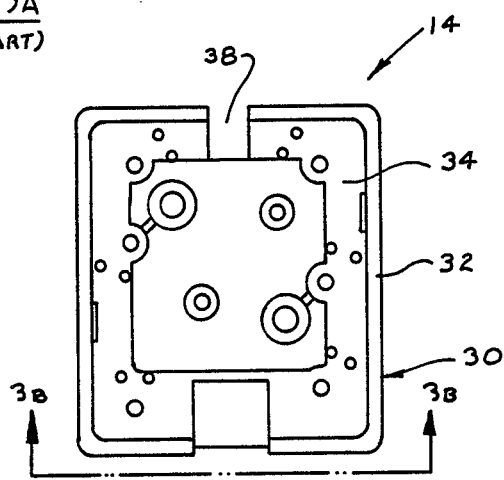
FIG. 3A is a rear elevation view of a third type of modular jack connecting plate in accordance with the prior art.
Figure 3B:
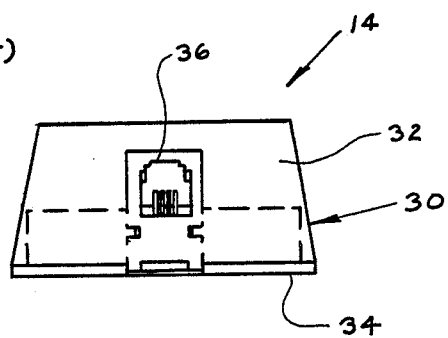
FIG. 3B is a side elevation view along the line 3B—3B of FIG. 3A.

With reference to FIGS. 3A and 3B, yet another well known type of modular jack connecting device is shown generally at 14. Connecting device 14 is a non-flush wall mount or baseboard mount and consists of a square, round or rectangular box 30 having a cover section 32 and a base section 34. A modular jack 36 is mounted within the interior of box 30 and is positioned along one side thereof (or alternatively along the top face) to receive a modular plug (not shown). Usually, an opening 38 is disposed opposite to modular jack 36 for accessing connecting leads (not shown). Connecting device 14 is usually mounted on a wall, baseboard or any other non-flush mounting application.

As discussed hereinabove, all three prior art modular jack connecting devices 10, 12 and 14 of FIGS. 1, 2, and 3, respectively, are well known to those skilled in the art. However, it has been found that the use of three structurally distinct connecting block structures suffer from some rather important economical deficiencies. Thus, end-users of such plates are required to purchase and inventory all three devices which can be quite expensive. Similar duplicative costs are incurred by the manufactures and wholesaler. Finally, the repairer and installer often finds it quite burdensome to equip and utilize all three types of connecting devices. Moreover, these drawbacks are multiplied even further as all three prior art connecting devices must utilize one of three distinct two, four, six or eight wire modular jacks.

The above-discussed and other drawbacks of the prior art modular jack connecting devices of FIGS. 1, 2 and 3 are overcome by the modular jack connecting block of the present invention shown in FIGS. 4-8. Moreover, the modular jack connecting block of the present invention provides many other features and advantages heretofore not found in the prior art.

Referring simultaneously to FIGS. 4-8, a modular jack connecting block in accordance with the present invention is shown generally at 40. In essence, the novel structure of connecting block 40 overcomes the above-discussed problems by combining the functions of all three prior art connecting devices 10, 12 and 14 of FIGS. 1, 2 and 3, respectively. Modular jack connecting block 40 comprises a substantially rectangular electrically nonconductive (i.e., plastic) plate 42 having front and rear faces 43 and 44, respectively. Each corner 45 of plate 42 is preferably diagonally cut and includes an opening or mounting hole 46 for attachment thereof to a wall. Note that due to limited space requirements, one hole 46' is substantially circular in shape while the other holes 46 have an oval shape. At about the center of plate 42 is a modular jack 48. Modular jack 48 is preferably flush with the rear face 44 of plate 42 while it protrudes outwardly from the front face 43 (see FIGS. 5, 6 and 8). Modular jack 48 is well known and has an opening therein for receiving a well known modular plug. As shown in FIGS. 4-8, connecting plate 42 is quite similar to prior art connecting plate 10 of FIG. 1. Thus, modular jack connecting block 40 as shown in FIGS. 4-8 is well suited to be used in conjunction with attaching a wall phone or the like to a wall, box or other suitable mounting. It will be appreciated that a wall phone or the like is attached to plate 42 via a pair of connecting tabs or studs 50 as shown in FIGS. 4 and 6. Tabs 50 will communicate with corresponding openings in a wall phone or the like (not shown) to effect attachment therebetween.

Modular jack connecting block 40 is preferably provided with still other mounting holes to effect mounting on almost any well known box or bracket. Thus, openings or mounting holes 52 are located directly above and below tabs 50 and are well suited for mounting conventional AC boxes. Additionally, mounting holes 54 are provided diagonally across from each other along the interior of plate 42 for mounting onto certain other known brackets and electrical boxes. Thus, connecting block 40 may be easily and quickly mounted on a plurality of known brackets and wall boxes.

Figure 7:
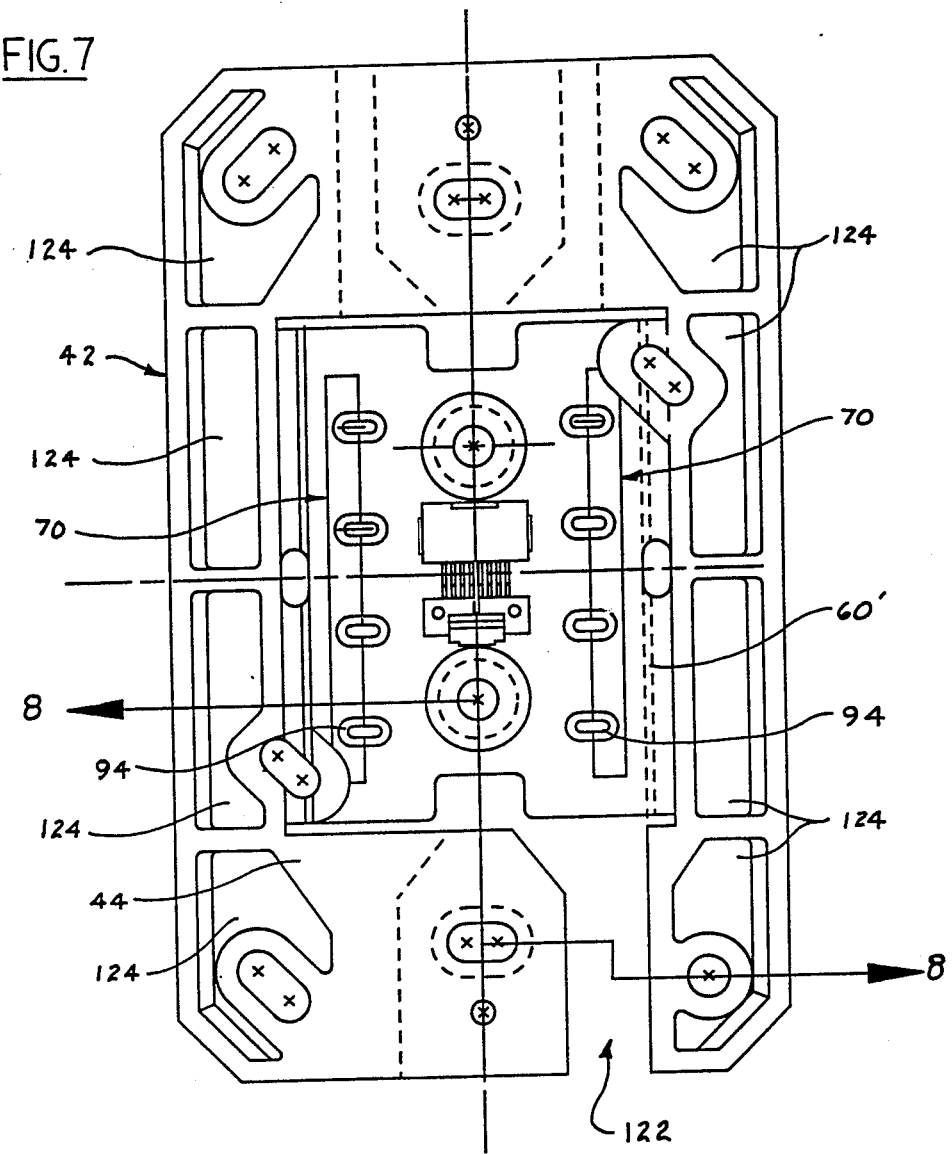
FIG. 7 is a rear elevation view of the modular jack connecting block of FIG. 4.
Figure 8:
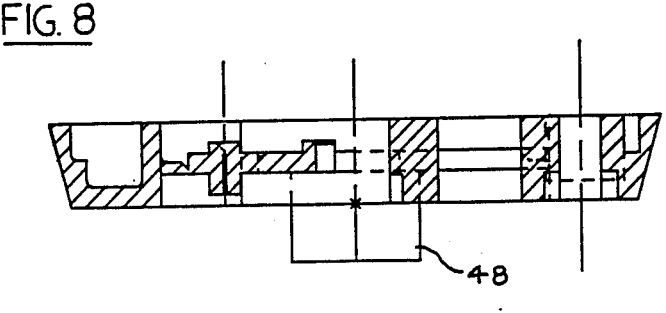
FIG. 8 is a cross-sectional elevation view along the line 8A—8A of FIG. 7.

An important feature of the present invention is the presence of at least one rectangular break-out or cut-out region 55 in the interior portion of connecting plate 42. This separable break-out section 55 is defined by the voids 56 and 58 and the lines 60 (FIG. 4) and 60' (FIG. 7). It should be understood that lines 60 and 60' are actually a recessed portion of plate 42 wherein the thickness of plate 42 is reduced relative to most of the other portions of the plate. Thus, when rectangular region 55 is broken or snapped away from the surrounding plate 42, a structurally distinct modular jack connecting block, structurally and functionally similar to non-flush connecting plate 14 of FIG. 3, is created. Mounting holes 64 are provided to snap-out portion 55 to effect mounting thereof onto baseboards, walls or other non-flush mounting applications. Preferably, pry slots 62 are provided on either side of lines 60, 60' to facilitate the breaking or snapping out of interior section 55. It will be appreciated that subsequent to breaking out separable interior section 55, the remaining portion of connecting plate 42 will have a central opening therethrough.

Figure 9B:
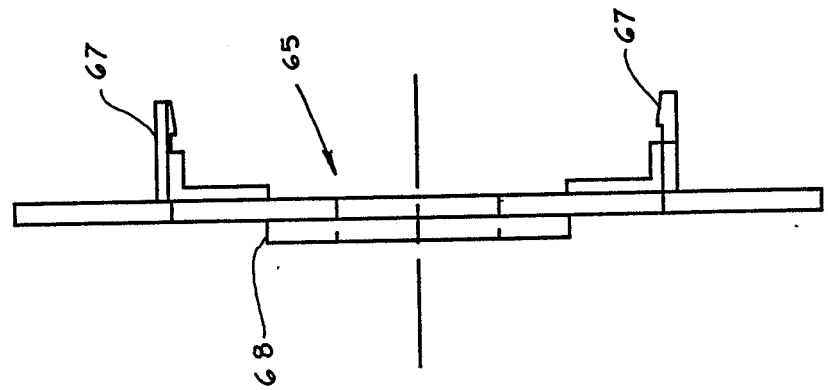
FIG. 9B is a side elevation view of the octagonal insert of FIG. 9A.
Figure 9A:
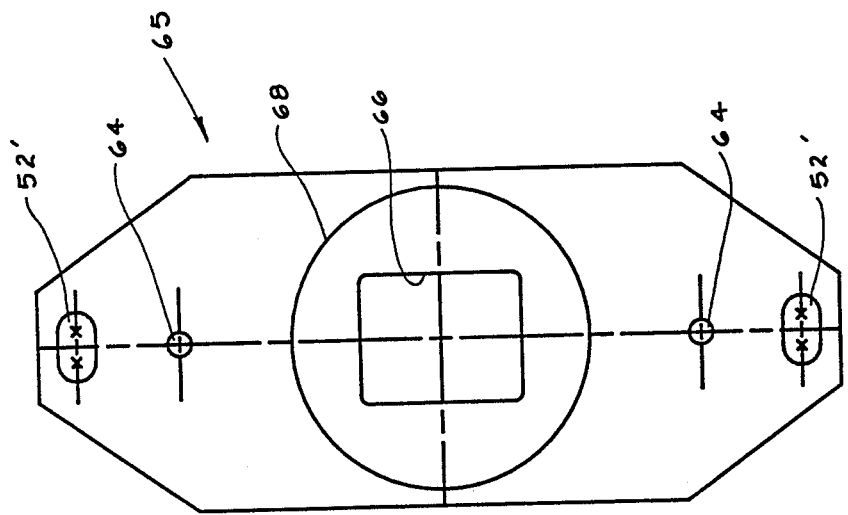
FIG. 9A is a front elevation view of an octagonal insert used in conjunction with the connecting block of FIG. 4.
Figure 10:
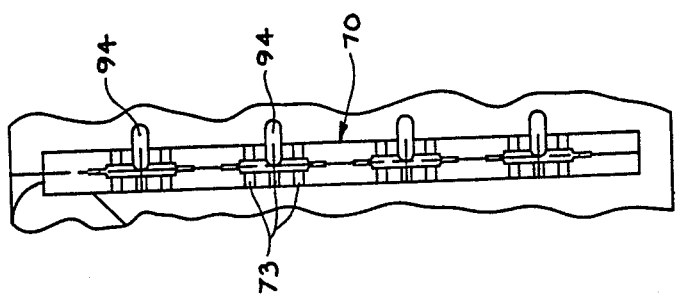
FIG. 10 is an enlarged front elevation view of one of the insulation displacement connector assemblies shown in FIG. 4.
Figure 11:
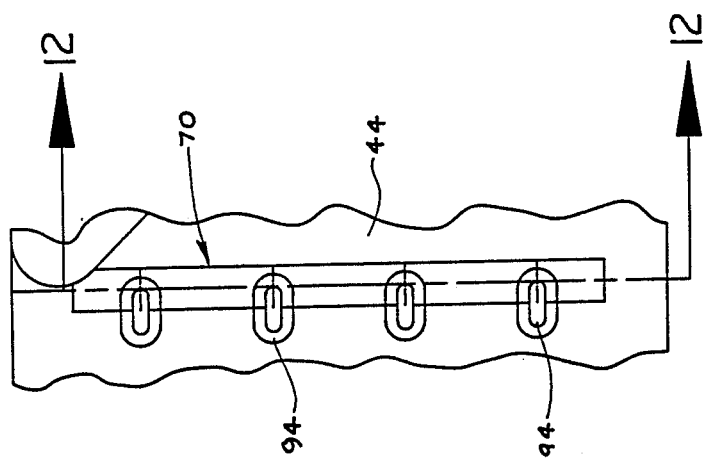
FIG. 11 is an enlarged rear elevation view of one of the insulation displacement connector (IDC) assemblies shown in FIG. 7.
Figure 12:
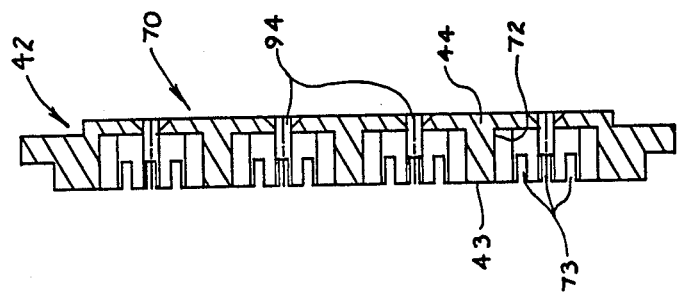
FIG. 12 is a cross-sectional elevation view along the line 12—12 of FIG. 11.

Referring now to FIGS. 9A and 9B, an octagonal add-on or cover plate portion specifically adapted to snap onto the front face of section 55 is identified at 65. Preferably, octagonal insert 65 is used in conjunction with the rectangular break-out region 55 of connecting plate 42. Octagonal insert 65 includes an inner rectangular opening 66 surrounded by a circular (or oval region) 68. Insert 65 also includes mounting holes 52' which correspond to mounting holes 52 in plate 42 and snap-action mounting means 67. During use, rectangular opening 66 of octagonal insert 65 is disposed over protruding modular jack 48 wherein mounting means 67 will effect a snap fit over the two outside edges 69 of portion 55. Additional mounting holes 64 are provided for a decorative face plate to be attached thereto. Thus, when add-on section 65 is connected to the snap-out interior portion 55 of connecting plate 40, a modular jack connecting device functionally and structurally similar to the connecting device 12 of FIG. 2 is created.

The modular jack connecting block 40 of the present invention thus permits one connecting device to be used in applications which have previously necessitated at least three devices (i.e., the devices of FIGS. 1, 2, and 3). Accordingly, duplication in manufacturing, purchasing, inventory, etc. is far reduced resulting in great cost savings. Moreover, the installer or repairer in the field need only be provided with one type of modular jack connecting block which can be used in plural applications.

While the novel structure of the present invention combines the functions of at least three types of existing modular jack connecting devices, other structural features heretofore not found in the prior art are also provided which permit block 40 to be used in at least ten different applications.

Referring now to the FIGS. 4, 7 and 10-16, in a preferred embodiment of the present invention, modular jack connecting block 40 is provided with four pairs of insulation displacement connectors (IDC's) shown generally at 70. It will be appreciated that IDC's 70 protrude upwardly from the surface 43 defined by the interior portion 55. Each insulation displacement connector 70 comprises four longitudinal slots 72 (FIG. 12) for receiving and holding four connector blades 74 (FIG. 16) and four groups of three parallel slots 73 (slots 73 being perpendicular to slots 72) for accessing wires or leads into and out of the IDC. Longitudinal slots 72 are surrounded by a pair of longitudinal sidewalls and a pair of end walls, with the longitudinal sidewalls including the groups of parallel slots 73 therein.

Figure 14:
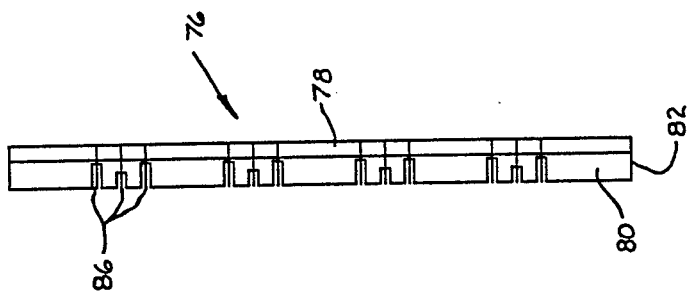
FIG. 14 is a side elevation view of the cover of FIG. 13.
Figure 15:
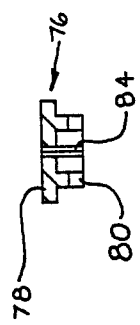
FIG. 15 is a cross-sectional elevation along the line 15—15 of FIG. 13.
Figure 13:
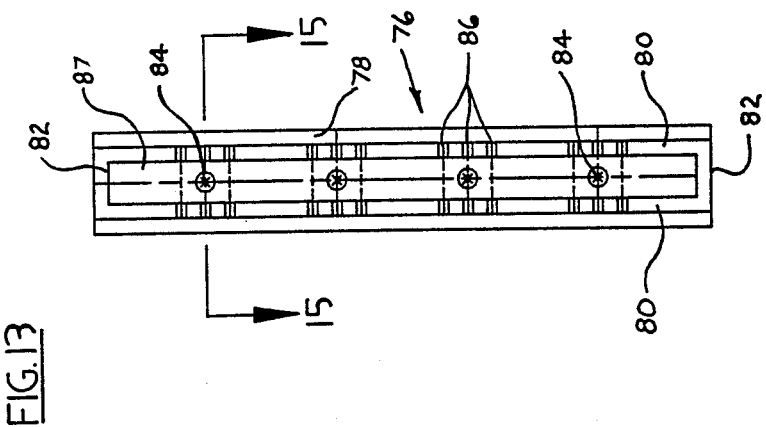
FIG. 13 is a bottom view of a cover used in conjunction with the insulation displacement connector of FIG. 4.

Each IDC 70 is sized to receive a substantially rectangular cover 76 (see FIGS. 13-15). Cover 76 comprises a rectangular top section 78 with depending longitudinal sidewalls 80 and end walls 82. Note that top section 78 overhangs depending sidewalls 80. Longitudinal sidewalls 80 include four groups of three parallel openings or slots 86 corresponding to each group of three vertical slots 73. Cover 76 is sized so as to receive in the open space 87 (space 87 being defined by sidewalls 80 and end walls 82), of the IDC 70 shown in FIG. 10. (It will be appreciated that the cover 76 and blades 74 have been removed from the block 40 in FIGS. 4 and 10). Cover 76 preferably includes a plurality of test holes 84 for receiving a test probe.

An enlargement of an IDC contact or connector blade 74 used in accordance with the present invention is shown in FIG. 16. Electrically conductive connector blade 74 includes a pair of connector sites 88 for interfacing incoming and outgoing leads and a third connector site 90 for interconnection with a lead from the modular jack. Preferably, each connection site 88 and 90 has converging side portions 92 which act to strip the insulation on the leads and effect electrical contact.

Insulation displacement connectors 70 are utilized by loading wires or leads (not shown) into connection sites 88 and 90. (The leads from the modular jack being connected to connection sites 90 and the other incoming and outgoing leads being connected to sites 88). It will be appreciated that the leads or wires from the modular jack 48 are brought from the rear surface 44 into the front surface 43 of plate 42 via the plural access openings 94 shown in FIGS. 4, 7, 10 and 11. Thereafter, the cap 76 is disposed over IDC 70 wherein cap 76 will act as a wire installation tool by frictionally engaging the protruding side and end walls of IDC 70 and urging the leads into mechanical and electrical attachment with blades 74. Note that subsequent to placing the cap in position, the leads will enter and exit the interior of the IDC through slots 73 and 86. The IDC's used in conjunction with the present invention permit wiring on the front face 43 of plate 42 or section 55. Front face wiring is easier and more convenient relative to back face wiring and is therefor a labor saving feature of connector block 40. It should be understood that voids 56 and 58 also function as a means for allowing any wiring from inside a box or wall to be brought onto the front face 43 for connection to the IDC's. Other incoming or outgoing leads or wires may access connector plate 42 via the several slots or recesses 93 which are provided for that purpose on the front face 43 of plate 42 as shown in FIG. 4.

The use of insulation displacement connectors in conjunction with the modular jack connecting block of the present invention provides many features and advantages over prior art wiring methods. For example, the IDC's permit relatively quick and easy installation and repair. Moreover, the IDC's allow for increased flexibility in wire configurations and designs as the IDC connections may be easily removed (disconnected) and rewired as desired.

Figure 17B:
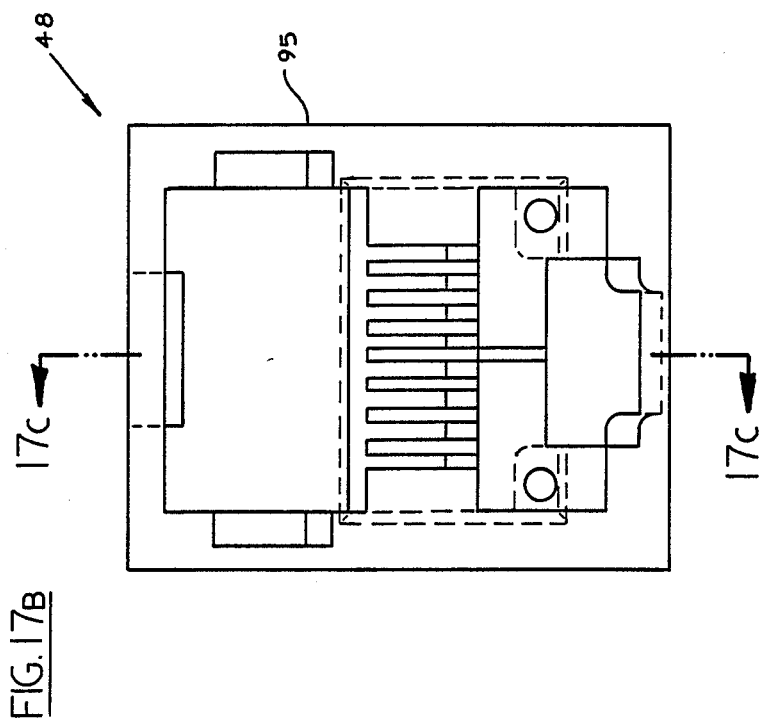
FIG. 17B is a rear elevation view of the modular jack of FIG. 17A.
Figure 17A:
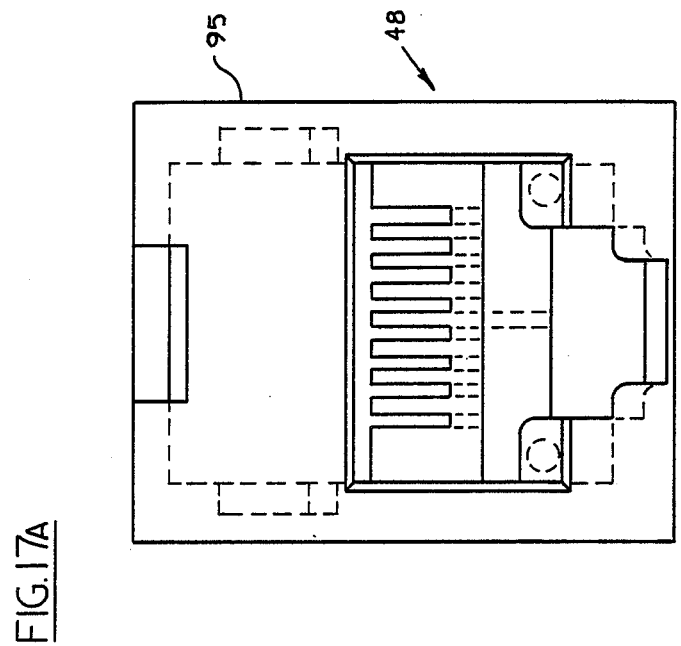
FIG. 17A is a front elevation view of a modular jack used in conjunction with the modular jack connecting block of FIGS. 4-8.
Figure 17C:
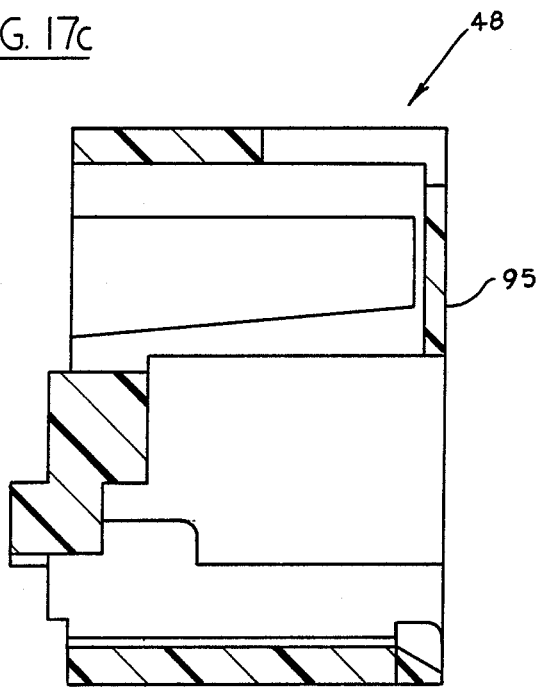
FIG. 17C is a cross-sectional elevation view along the line 17C—17C of FIG. 17B.

A standard wall phone generally utilizes two, four or six position (two, four or six wire) modular jack. While suitable for most purposes, there are certain applications wherein an eight position (eight wire) modular jack may be required. The present invention preferably includes a modified eight position modular jack which allows the use of either a two, four, six or eight wire modular plug. Referring to FIGS. 17A-17C, this modification is accomplished by reducing the size of the outside housing 95 of a standard eight wire modular jack 48 so as to be equal to a conventional or standard two, four or six position jack. Other than the modification to the outside housing 95 of modular jack 48, the remaining structural elements thereof are well known to those skilled in the art and so no further discussion is necessary. The use of a modified modular jack permits the instant invention to be used interchangeably with any two, four, six or eight wire modular plug. Thus, whereas the prior art necessitated the use of connecting blocks having a particular modular jack for a particular size modular plug, the modular jack of the present invention may be used with any size modular plug. Alternatively, the present invention may employ a standard two, four, six or eight wire modular jack.

Figure 18:
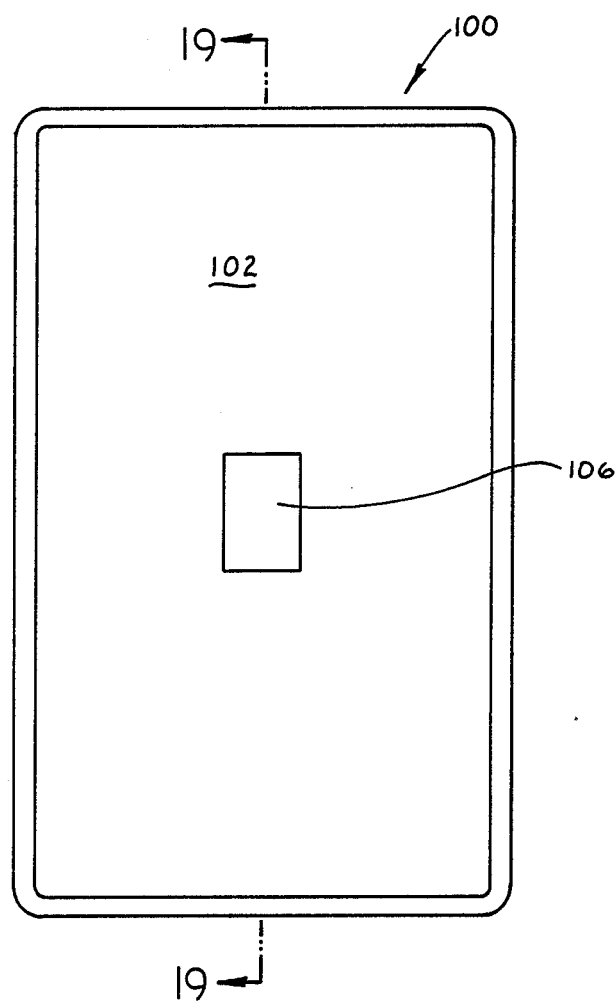
FIG. 18 is a front elevation view of a cover plate used in conjunction with the modular jack connecting block of FIGS. 4-8.
Figure 19:
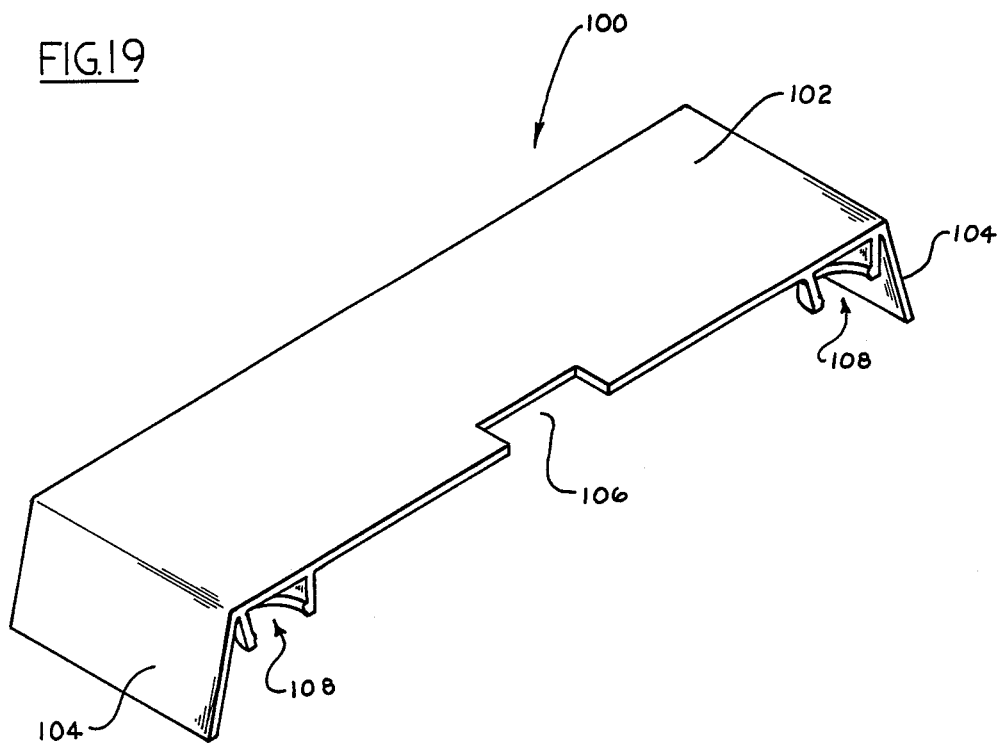
FIG. 19 is a perspective view taken along the line 19—19 of FIG. 18.

Turning now to FIGS. 18 and 19, an optional decorative and/or insulative cover plate is shown generally at 100. Cover plate 100 includes a front face 102 with depending sidewalls 104 and a central aperature 106 therethrough. Attachment means 108 allow a snap fit with tabs or studs 50 (FIGS. 4 and 6) while sidewalls 104 allow flush mounting of the cover plate with the modular jack. It will be understood that aperture 106 allows access between a modular plug (not shown) and the modular jack of the connecting block of the present invention. The use of a cover plate 100 such as shown in FIGS. 18 and 19 transform modular jack connecting block 42 into a standard electrical outlet plate sized non-flush mount unit. It will be appreciated that some versions of the connecting plate of the present invention also permit the use of standard electrical outlet plates to be used therewith.

Figure 20:
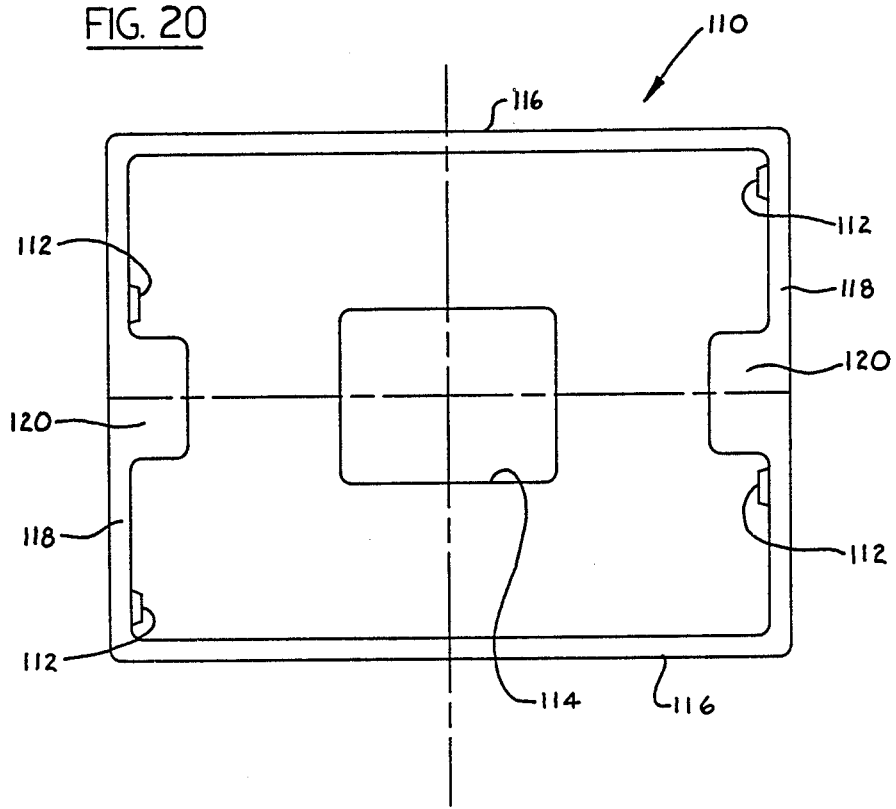
FIG. 20 is a bottom view of another cover plate used in conjunction with the modular jack connecting block of the present invention.
Figure 21:
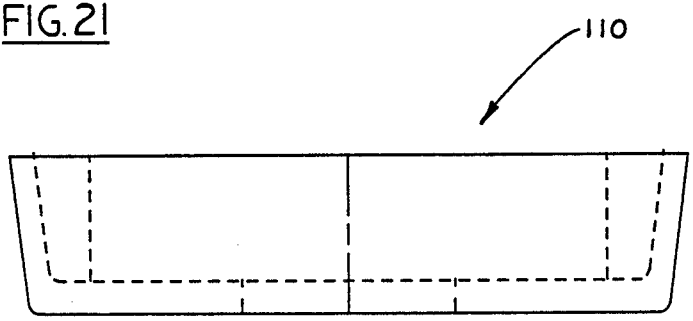
FIG. 21 is a side elevation view of the cover plate of FIG. 20.

In FIGS. 20 and 21, a similar decorative and/or insulating cover plate is shown generally at 110. Cover plate 110 is designed to provide a protective covering to separated interior connector plate 55. Cover 110 includes four protrusions 112 for effecting a snap fit over side walls 69 of interior connector plate 55 and a central aperture 114 for permitting access to the modular jack. As with cover plate 100 of FIGS. 19 and 20, cover plate 110 includes depending sidewalls 116 and 118 which also allow flush mounting of the cover plate with the modular jack. Note that sidewalls 118 include inverted U-section 120 which will correspond to the shapes of the voids 56 and 58 which will remain after interior plate 55 has been removed from surrounding plate 42.

Preferably, plate 42 of the present invention includes a slot 122 extending in from the bottom end thereof (See FIGS. 4 and 7). Slot 122 provides a space to slip a telephone or other cable through, during for example, changeover from prior art type wiring (i.e. non-modular plug/jack) to current wiring utilizing modular plugs and jacks. Preferably, the cosmetic cover plate 100 of FIGS. 18 and 19 will be used with plate 42 during this changeover procedure.

The modular jack connecting block 40 of the present invention (including any of the variations discussed hereinabove) may be provided with an optional magnetic backing, sticky wax adhesive or other suitable mounting means so as to facilitate mounting on metal or other flat surfaces, i.e. desks. This magnetic or sticky backing could be in the form of a solid sheet or smaller plural segments. The use of a sticky wax adhesive is particularly advantageous as it permits the present invention to be mounted on almost any type of planar surface.

Referring to FIG. 7, it will be appreciated that the various recesses in plate 42 identified at 124 are for molding purposes only (so as to reduce the amount of manufacturing material), and may or may not be provided to connecting block 40.

Although the present invention has been described in conjunction with a single modular jack, it will be appreciated that more than one jack, i.e., duplex modular jack arrangements, may be utilized with the connecting block disclosed herein. Plural modular jack configuration would, of course, require associated modifications to connecting plate 42, insert 65 and covers 100 and 110.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A modular jack connecting device comprising:
   plate means, said plate means having a front face and a rear face;
   at least one interior portion of said plate means being separable therefrom, said plate means having a central opening therethrough when said separable interior portion is separated from said plate means;
   at least one modular jack connecting means attached to said separable interior portion of said plate means, said modular jack connecting means having an opening therein to permit access to a modular plug means, said opening being in said front face of said plate means; and
   cover plate means for attachment to said separable interior portion subsequent to said separable interior portion being separated from said plate means, said cover plate means being disposed over said separable interior portion and having an opening therethrough in alignment with said modular jack connecting means opening.

2. The device of claim 1 including:
   means for attaching said plate means to a surface.

3. The device of claim 2 wherein:
   said attaching means comprises a plurality of holes through said plate means.

4. The device of claim 1 wherein:
said separable interior portion has a substantially rectangular shape.

5. The device of claim 4 wherein:
said rectangular interior portion has at least one opening through said plate means along a first side thereof.

6. The device of claim 4 wherein:
said rectangular interior portion has two oppositely disposed openings through said plate means along two oppositely disposed sides thereof.

7. The device of claim 1 wherein:
said plate means has a reduced thickness relative to the thickness of the rest of said plate means along at least a part of said separable interior portion.

8. The device of claim 4 wherein:
said plate means has a reduced thickness relative to the thickness of the rest of said plate means along at least a part of said interior portion.

9. The device of claim 6 wherein:
said plate means has a reduced thickness relative to the thickness of the rest of said plate means along at least a part of said interior portion.

10. The device of claim 9 wherein:
said reduced thickness is located between said two openings.

11. The device of claim 1 including:
means for attaching said separable interior portion to a surface.

12. The device of claim 11 wherein:
said attaching means includes at least one mounting hole through said interior portion.

13. The device of claim 1 including:
at least one slot for prying said separable interior portion from said plate means.

14. The device of claim 1 wherein said plate means has a plurality of sides and including:
at least one slot means through said plate means and terminating at one of said sides thereof.

15. The device of claim 1 wherein:
said modular jack means is a standard modular jack means selected from the group comprising of two, four, six or eight position standard modular jack means.

16. The device of claim 1 wherein:
said modular jack means is eight position; and wherein:
said modular jack means includes a housing, said housing being equal in size to the housing of a standard six position modular jack means.

17. The device of claim 1 including:
plural openings through said plate means, said openings permitting access for electrical wiring from said rear face to said front face of said plate means.

18. The device of claim 1 including:
at least one insulation displacement connector means.

19. The device of claim 18 wherein said insulation displacement connector means includes:
a base means having longitudinal slots therein;
a pair of first longitudinal sidewalls and a pair of first end walls surrounding said longitudinal slots and protruding upwardly from said front face, said longitudinal sidewalls including parallel slots therein and perpendicular thereto for accessing wires;
cover means, said cover means being sized to receive said protruding base means; and
connector blade means, said blade means being disposed in said longitudinal slots, said blade means including at least a pair of connection sites for receiving wires wherein said cover means effects electrical contact between wires inserted in said connection sites and said blade means.

20. The device of claim 19 wherein said cover means comprises:
a top section having a pair of depending second longitudinal sidewalls and second end walls, said second sidewalls including plural openings therein corresponding to said parallel slots of said first sidewalls.

21. The device of claim 19 wherein said connection sites of said connector blade means includes:
converging side portions adapted to strip insulation from said wires inserted therein.

22. The device means of claim 19 wherein said connector blade includes:
said pair of connectors sites on one side thereof; and
a single connector site on the side opposite said one side.

23. The device of claim 1 wherein:
said plate means is substantially rectangular.

24. The device of claim 23 including:
a mounting hole in each corner of said rectangular plate means.

25. The device of claim 2 wherein:
said attaching means comprises amagnetic backing on said rear face of said plate means.

26. The device of claim 1 wherein:
said cover plate means has a substantially octagonal shape.

27. The device of claim 26 including:
a circular area on said cover plate means surrounding said modular jacks means.

28. The device of claim 1 wherein:
said modular jack connecting means terminates inwardly of said rear face of said plate means and protrudes outwardly from said front face of said plate means.

29. The device of claim 1 wherein said cover plate means includes attaching means, said attaching means including:
means for effecting a snap fit onto said separable interior portion.

30. The device of claim 1 including:
plate means cover means, said plate means cover means having depending sidewalls, said plate means cover means including means for attachment thereof to said front face of said plate means, said plate means cover means substantially corresponding to the size of said plate means.

31. The device of claim 1 wherein said cover plate means includes:
depending sidewalls, said cover plate means including means for attachment thereof to said front face of said separable interior portion of said plate means, said cover plate means substantially corresponding to the size of said separable interior portion of said plate means.

32. The device of claim 1 including:
at least one recess in said plate means for accessing wire leading thereto or therefrom.

33. The device of claim 2 wherein:
said attaching means comprises an adhesive applied to said rear face of said plate means.

34. The device of claim 33 wherein:
said adhesive is a wax adhesive.

35. The device of claim 1 including:
means for mounting said plate means to an electrical box or bracket.

36. The device of claim 35 wherein:
said mounting means comprises mounting holes.

37. The device of claim 1 including:
means on said front face for attaching a telephone thereon.

38. A modular jack connecting device comprising:
plate means, said plate means having a front face and a rear face;
at least one interior portion of said plate means being separable therefrom;
at least one modular jack connecting means attached to said separable interior portion of said plate means, said modular jack connecting means having an opening therein for receiving a modular plug means, said opening being in said front face of said plate means;
cover plate means for attachment to said separable interior portion subsequent to said separable interior portion being separated from said plate means, said cover plate means being disposed over said separable interior portion and having an opening therethrough in alignment with said modular jack connecting means opening; and
at least one insulation displacement connector means.

39. The device of claim 38 wherein said insulation displacement connector means includes:
a base means having longitudinal slots therein;
a pair of first longitudinal sidewalls and a pair of first end walls surrounding said longitudinal slots and protruding upwardly from said front face, said longitudinal sidewalls including parallel slots therein and perpendicular thereto for accessing wires;
cover means, said cover means being sized to receive said protruding base means; and
connector blade means, said blade means being disposed in said longitudinal slots, said blade means including at least a pair of connection sites for receiving wires wherein said cover means effects electrical contact between wires inserted in said connection sites and said blade means.

40. The device of claim 39 wherein said cover means comprises:
a top section having a pair of depending second longitudinal sidewalls and second end walls, said second sidewalls including plural openings therein corresponding to said parallel slots of said first sidewalls.

41. The device of claim 39 wherein said connection sites of said connector blade means includes:
converging side portions adapted to strip insulation from wires inserted therein.

42. The device of claim 39 wherein said connector blade means includes:
said pair of connector sites on one side thereof; and
a single connector site on the side opposite said one side.

* * * * *